(No Model.)
2 Sheets—Sheet 1.
F. G. BRIGHT.
RUNNING GEAR FOR CULTIVATORS.
No. 322,411. Patented July 21, 1885.
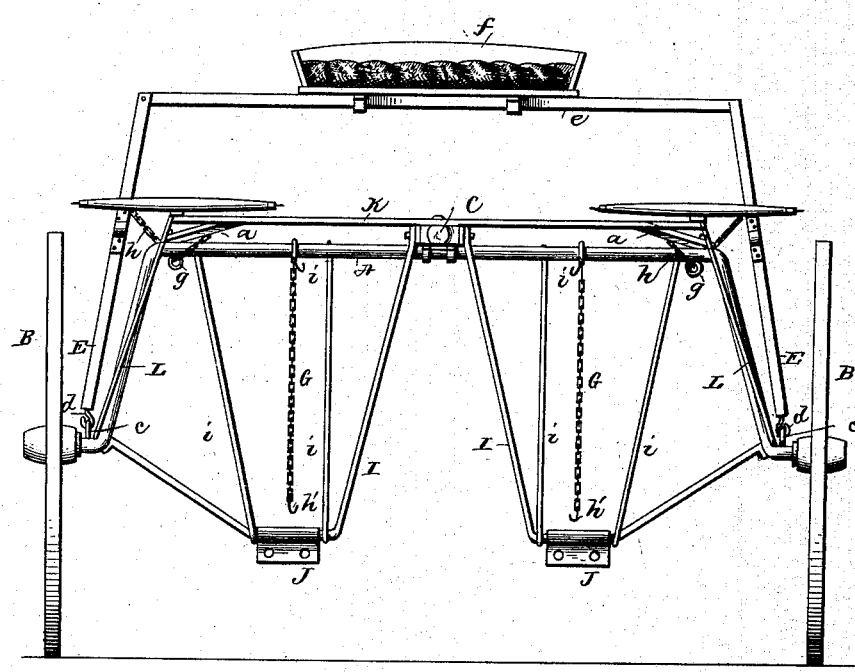
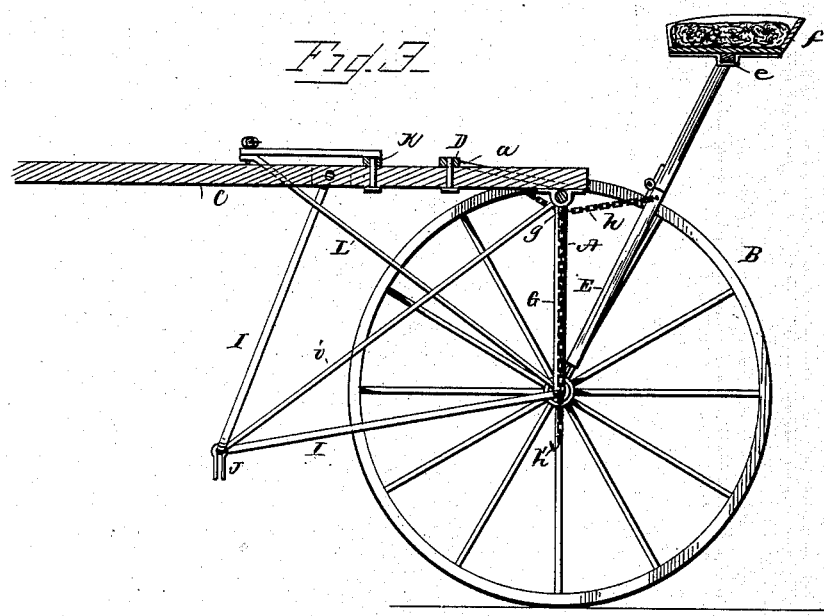
WITNESSES
INVENTOR (No Model.) 2 Sheets—Sheet 2.
F. G. BRIGHT.
RUNNING GEAR FOR CULTIVATORS.
No. 322,411. Patented July 21, 1885.
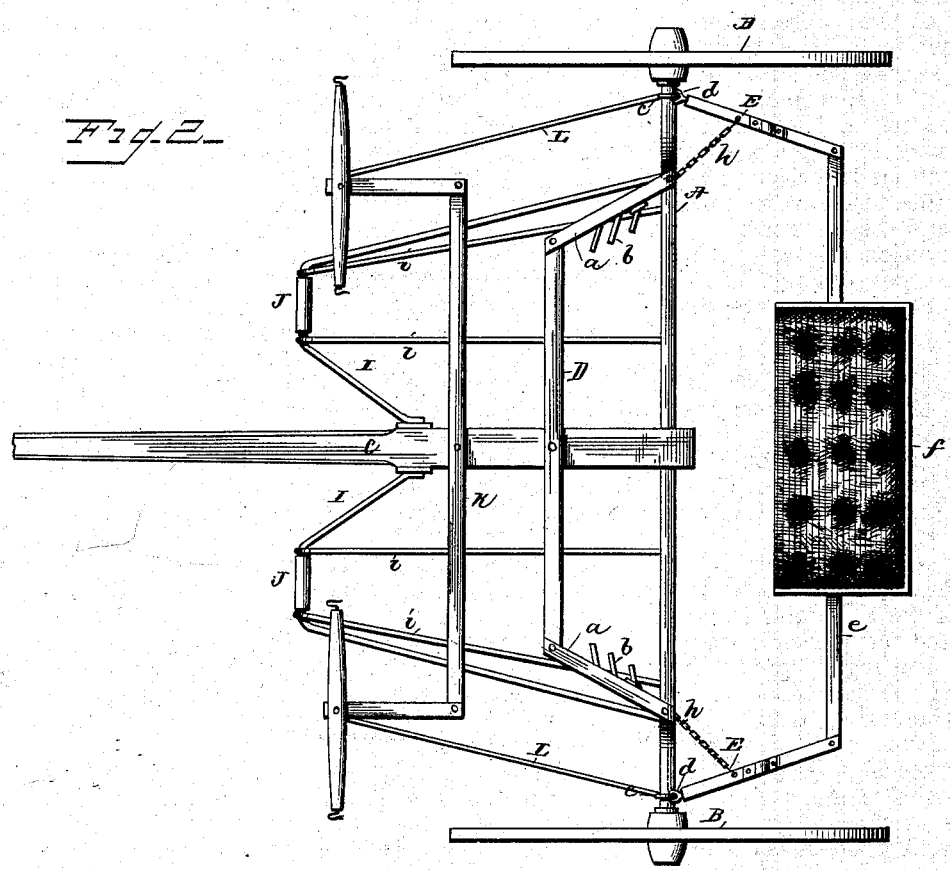
WITNESSES
INVENTOR
by
Attorney

United States Patent Office.

FERGUSON G. BRIGHT, OF GREENWICH, KANSAS.

RUNNING-GEAR FOR CULTIVATORS.

SPECIFICATION forming part of Letters Patent No. 322,411, dated July 21, 1885.

Application filed March 21, 1885. (No model.)

*To all whom it may concern:*

Be it known that I, FERGUSON G. BRIGHT, a citizen of the United States, residing at Greenwich, in the county of Sedgwick and State of Kansas, have invented certain new and useful Improvements in Running-Gear for Cultivators; and I do hereby declare that the following is a full, clear, and exact description of the invention, which will enable others skilled in the art to which it appertains to make and use the same.

My invention relates to improvements in the running-gear of combined riding and walking cultivators; and it has for its object to provide a seat which may be folded and to provide the same with supporting means whereby the weight of the driver may be shifted as circumstances may require, to provide improved means for holding the cultivators in a raised position in traveling from place to place, and to provide an improved construction of frame for the attachment of the cultivators.

With these ends in view the invention consists in the improved construction and combinations of parts hereinafter fully described, and pointed out in the claims.

In the drawings, Figure 1 is a front elevation of my improvement. Fig. 2 is a plan view of the same. Fig. 3 is a longitudinal vertical section.

In the accompanying drawings, in which like letters of reference indicate corresponding parts in all the figures, A represents a cranked axle upon the spindles of which are mounted carrying-wheels B B. Secured to the axle, midway its ends, is a tongue, C, to which is secured, a short distance from the axle A, a cross-beam, D, having its ends connected with the axle by bars $a$, having pins $b$. On the axle A, near the spindles thereof, are secured eyebolts $c$, which are adapted to be engaged by hooks $d$ on the ends of the bars E, hinged about midway their ends. The said bars or plates are connected at their other ends by a cross-bar, $e$, thus constructing a seat-frame on the bar $e$, midway the ends of which is mounted a seat, $f$. Upon the under side of the axle A are provided loops $g$, through which pass chains $h$, secured to the side bars or plates of the seat-frame, said chains being adapted to engage the pins $b$, thus supporting the seat-frame and allowing it to be raised and lowered to throw the weight of the driver either forward or backward, as may be desired. Secured upon the axle A, upon opposite sides of the tongue, at equal distance from the tongue, are chains G, having hooks $h'$ at their lower ends, adapted to engage hooks $i$ at the upper ends of said chains.

By this arrangement the cultivator-frame may be raised by passing said chains under the same and attaching the hooks at the lower ends of the chains to the hooks on the upper ends of the same.

I I represent rods or bars, which are bolted to the tongue at their inner ends, their outer ends being bolted to the axle A, adjacent to the spindles thereof. The said rods or bars I I are bent outwardly from their point of attachment to the spindles and tongue, and upon said rods or bars are mounted brackets J J, which comprise a bearing portion fitting upon said rods or bars, and having downwardly-extending side flanges provided with holes or openings, said side flanges being adapted to receive or fit over any of the beams of the cultivator, (not shown,) and be secured thereto by bolts passing through openings in the said flanges. The bars or rods I I are braced by rods $i$ $i$, secured to the axle at their upper ends.

K represents a double-tree, which is secured to the tongue, and bracing said double-tree are rods L, secured to and connecting the ends of the double-tree with the axle.

I claim as my invention and desire to secure by Letters Patent—

1. The combination, with the axle-seat frame comprising folding sections hinged together, the whole being hinged to the axle, of chains secured to the said seat-frame, and bars having a series of pins adapted to engage the ends of said chains, all substantially as shown, and for the purpose described.

2. The combination, with the axle and tongue, of the bars or rods I I, connected with the sides of the tongue and with the axle near its spindle, and the bracing-rods $i$ $i$, connecting the lower portion of said rods with the axle, substantially as shown and described.

3. The combination, with the axle, of the seat-frame hinged thereto, and comprising the sectional side plates hinged together and connected at their ends by a plate carrying a seat, chains secured to said side plates, a cross-beam connected with the axle by bars having hooks or pins, and loops secured to the under side of the axle, substantially as set forth.

In testimony whereof I affix my signature in presence of two witnesses.

FERGUSON G. BRIGHT.

Witnesses:
J. E. HUMPHREY,
W. U. COX.